(12) United States Patent
Chapman

(10) Patent No.: US 8,770,866 B2
(45) Date of Patent: Jul. 8, 2014

(54) CAMERA SWING HEAD

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 13/540,907

(22) Filed: Jul. 3, 2012

(65) Prior Publication Data

US 2014/0010525 A1    Jan. 9, 2014

(51) Int. Cl.
*G03B 1/56* (2006.01)
*F16M 11/04* (2006.01)
*G03B 17/00* (2006.01)

(52) U.S. Cl.
USPC .................. 396/428; 248/187.1; 352/243

(58) Field of Classification Search
USPC .................. 396/419, 428; 352/243; 348/373
See application file for complete search history.

(56) References Cited

U.S. PATENT DOCUMENTS

| | | | | |
|---|---|---|---|---|
| 3,138,400 A * | 6/1964 | Reid | ................ | 297/19 |
| 4,989,823 A | 2/1991 | Chapman | | |
| 5,312,121 A | 5/1994 | Chapman | | |
| 5,816,552 A | 10/1998 | Chapman | | |
| 6,086,207 A * | 7/2000 | Chapman | ................ | 352/243 |
| 7,137,747 B2 | 11/2006 | Chapman | | |
| 2005/0232625 A1 | 10/2005 | Chapman | | |
| 2006/0128535 A1* | 6/2006 | Smith | ................ | 482/94 |
| 2006/0239678 A1 | 10/2006 | Itzkowitz | | |
| 2010/0301164 A1 | 12/2010 | Hudson | | |
| 2012/0192672 A1* | 8/2012 | Horikoshi et al. | ................ | 74/502.2 |

FOREIGN PATENT DOCUMENTS

| | | | |
|---|---|---|---|
| JP | 2004-340372 A | 12/2004 | |
| JP | 2009180764 A1 | 8/2009 | |

OTHER PUBLICATIONS

Chapman/Leonard Studio Equipment, Inc. 2005-06 Catalog, pp. 22, 25, 38, 39, 42, 50, 57, 70, 74 and 75.
Chapman/Leonard Studio Equipment, Inc. 2008-10 Catalog, pp. 68-70.
Rotating Offset, Pivot (ROP), www.jlfisher.com/dollies/optional_accessories . . . (Jun. 28, 2012).
Korean Intellectual Property Office, International Search Report and Written Opinion for PCT/US2013/047976, Sep. 26, 2013.

* cited by examiner

*Primary Examiner* — Clayton E LaBalle
*Assistant Examiner* — Noam Reisner
(74) *Attorney, Agent, or Firm* — Kenneth H. Ohriner; Perkins Coie LLP

(57) ABSTRACT

A camera swing head includes a hub having a hole ring including a plurality of radially spaced apart holes. A swing plate is rotatably attached to the hub. An indexing and locking assembly allows the swing to be quickly and easily rotated to a desired position and then locked into place. The indexing and locking assembly may include a lever pivotally attached to the swing plate, and a plunger pivotally attached to a front end of the lever. Pivoting movement of the lever may move the plunger linearly on a radial axis intersecting a center of the hub. A release pin is movable from, a first position, wherein the release pin causes the plunger to be held out from engagement with one of the radially spaced apart holes, to a second position, wherein the plunger is movable into engagement with one of the radially spaced apart holes.

15 Claims, 5 Drawing Sheets

CAMERA SWING HEAD

BACKGROUND OF THE INVENTION

The field of the invention is camera swing heads. In motion picture or video filming, the camera is often mounted on a camera head, to allow the camera to be smoothly moved. Various types of camera head have been used including camera heads for moving the camera in pan and tilt axes and fluid heads that provide smooth and silent operation. Other types of camera heads are used to set up the camera in a desired position between filming sequences, or to achieve specific types of movement. Swing heads are used for this purpose to rotate or swing the camera on a swing plate about a fixed axis into a desired position, and then optionally lock the swing plate against further movement. Although various swing heads have been used, disadvantages remain in their design and use. It is an object of the invention to provide an improved camera swing head.

SUMMARY OF THE INVENTION

In a new camera swing head, a hub has a plurality of radially spaced apart indexing holes. A swing plate is rotatably attached to the hub. An indexing and locking assembly allows the swing plate to be quickly and easily rotated to a desired position and then locked into place. The indexing and locking assembly may include a lever pivotally attached to the swing plate, and a plunger pivotally attached to a front end of the lever, with a plunger spring urging the plunger into one of the holes. Pivoting movement of the lever may move the plunger linearly on a radial axis intersecting a center of the hub. A release pin is movable from a first position, wherein the release pin causes the plunger to be held out from engagement with one of the radially spaced apart holes, to a second position, wherein the plunger is movable into engagement with one of the radially spaced apart holes.

DETAILED DESCRIPTION

Figure 1:
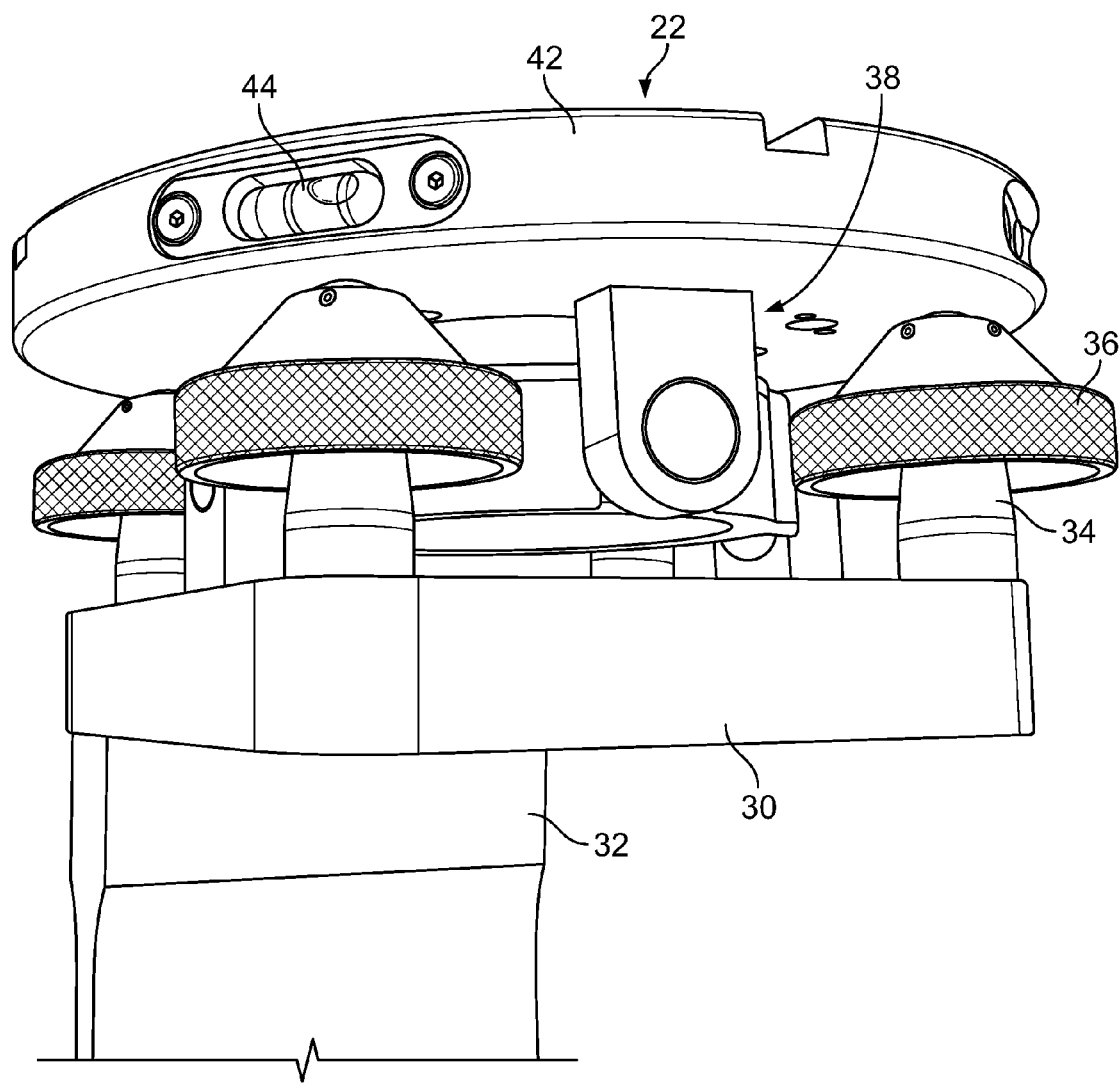
FIG. 1 is a perspective side view of a camera leveling head.

As shown in FIG. 1, a leveling head 22 is includes a level plate 42 attached to a base or nose plate 30 of a nose bracket 24 via a universal joint 38. A nose arm 32 of the nose bracket may be attached to the arm or a camera crane or a camera dolly. The universal joint 38 allows the level plate 42 to pivot about lateral and longitudinal axes. The level plate 42 may be leveled using thumbwheels 36 attached to jack screws 34. Bubble levels 44 may be provided on the level plate 42 to provide visual indicators of the position of the level plate 42.

Figure 2:
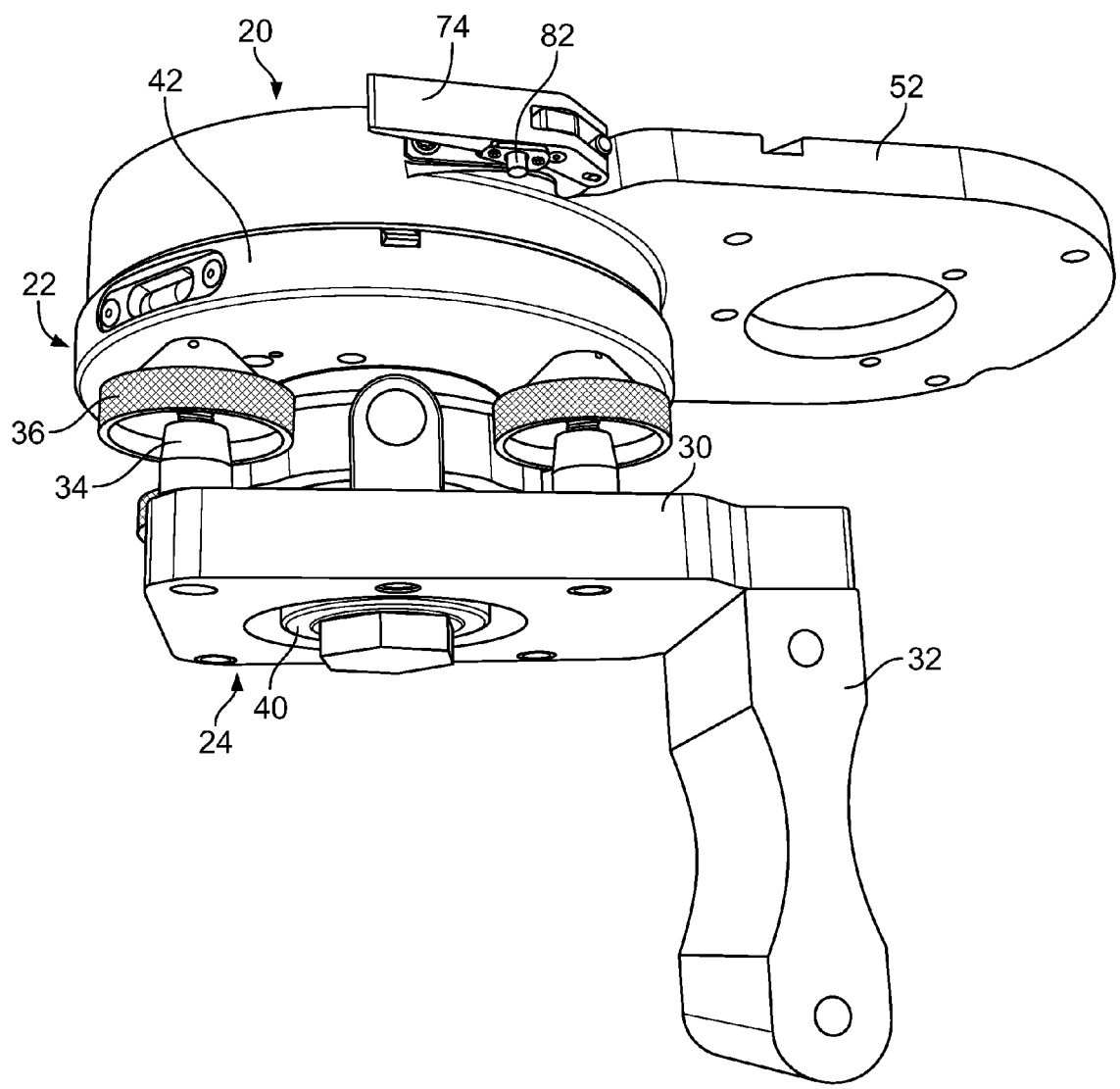
FIG. 2 is a side and bottom perspective view of the camera leveling head of FIG. 2 with a swing head attached to the leveling head.
Figure 3:
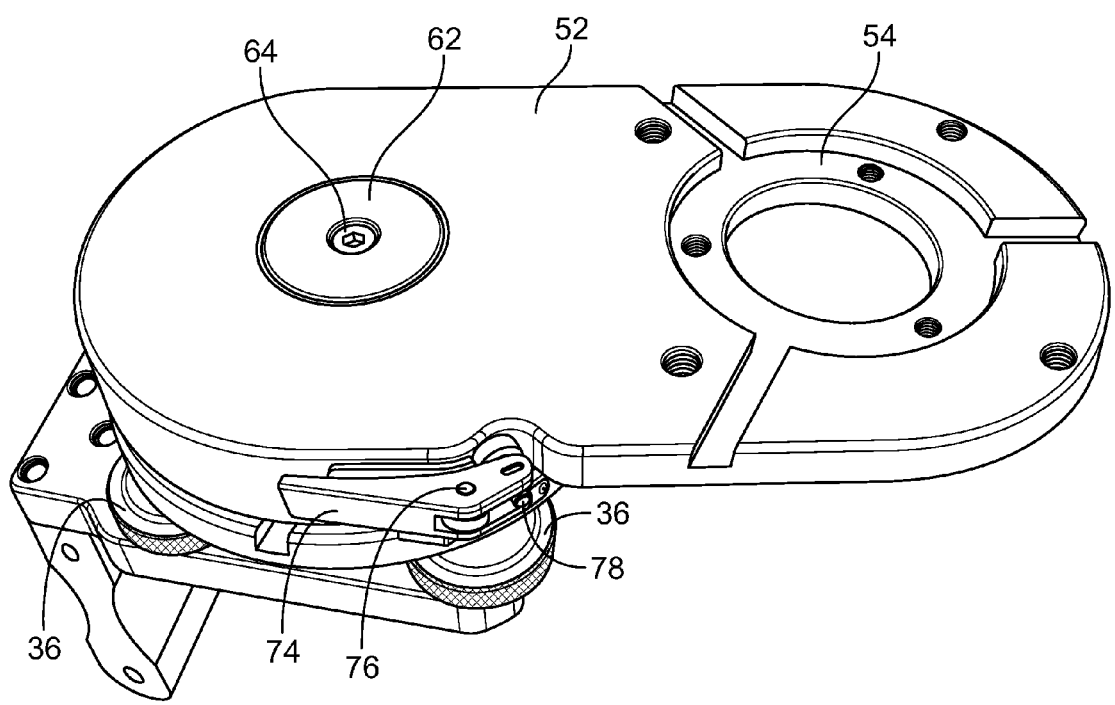
FIG. 3 is a top perspective view of the swing head shown in FIG. 2.
Figure 4:
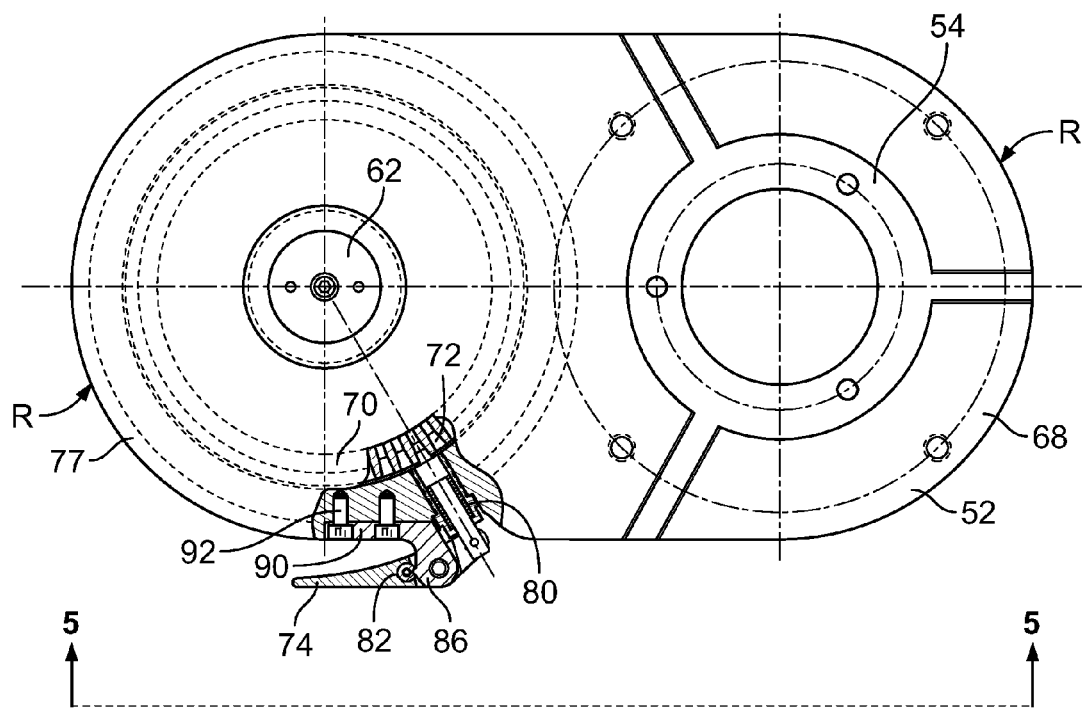
FIG. 4 is a top view in part section of the swing head shown in FIG. 3.
Figure 5:
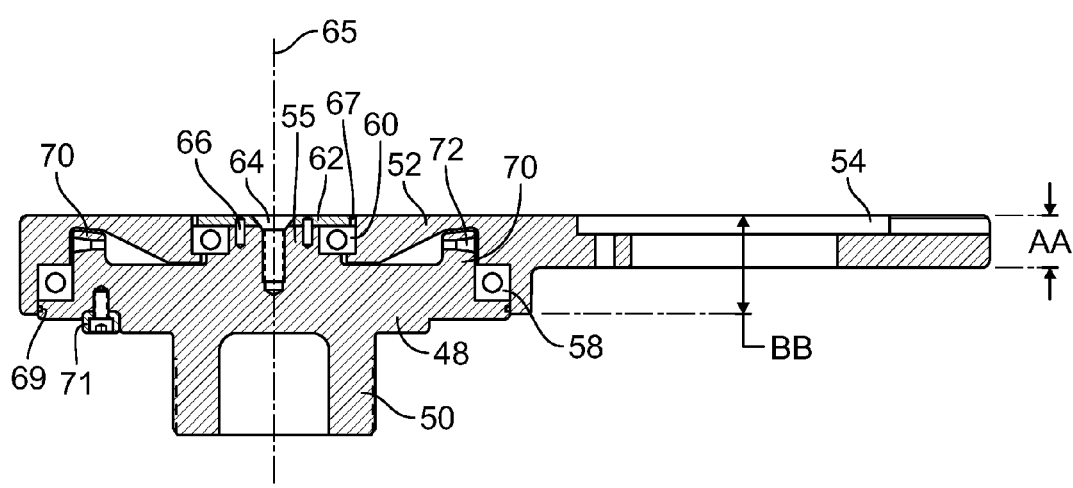
FIG. 5 is a section view taken along line 5-5 of FIG. 4.

As shown in FIGS. 2 and 3, a swing head 20 may be attached to the level plate 42. Alternatively the swing head 20 may be attached directly to another supporting structure, without using the leveling head. As shown in FIGS. 4 and 5, the swing head 20 has a swing plate 52 rotatably attached to a hub 48. The hub 48 may include a threaded stud 50, allowing the hub 48 to be attached to the level plate 42 by passing a bolt tube 40, shown in FIG. 2, up through holes in the nose plate 30 and the level plate 42, with the bolt tube 40 threaded onto the stud 50 of the hub 48. The threaded stud 50 may have a standard 2¾ diameter, with a key 71 on a bottom surface of the hub 48 engaging into a slot on the level plate 42, or other supporting surface, to prevent the hub 48 from rotating.

Referring once again to FIGS. 4 and 5, the swing plate 52 may be an oval, with straight sides and rounded opposite ends optionally having the same radius of curvature. A camera mounting fitting 54, such as a Mitchell mount, is provided on the outer end of the swing plate 52, typically centered on the circle defined by the radius R of the outer end 68 of the swing plate 52.

Referring to FIG. 5, an outer bearing 58 is positioned on or around a hole ring 70 on the hub 48. A seal such as an o-ring may be used to provide a low-friction seal between the hub 48 and the swing plate 52, to seal the outer bearing 58 from the environment. The outer bearing 58 may have a diameter equal to 85 to 100% of the outer diameter of the hub 48. FIG. 5 shows a design with the outer bearing 58 having a diameter equal to (i.e., 100% of) the outer diameter of the hub. This increase the load carrying capacity of the swing head 20.

The hole ring 70 has radially spaced apart holes 72. The holes 72 may be tapered holes and may also be evenly spaced apart. Each hole 72 is aligned on an axis, or radius, extending through a swing axis 65. An inner bearing 60 is positioned on or around a center post 55 on the hub 48. The swing plate is rotatably attached to the hub via the inner and outer bearings 58 and 60, which may optionally be pressed onto or into the hub or the swing plate 52. A cap plate 62 may be secured over the inner bearing 60 using a cap bolt 64, with cap pins 66 locking the cap plate 62 onto the center post 55, and preventing the cap plate from rotating with the swing head. A o-ring or similar seal element may be lightly pressed into the gap between the cap plate 62 and the swing pate 52, to seal the inner bearing 60 from the environment. The inner end 75 of the swing plate may have a radius of curvature R, equal to the radius of curvature of the outer end 68. The swing plate 52 may have, a length equal to about 3-6 R, or longer, with the example shown having a length of about 3.5 to 4 R.

Figure 6:
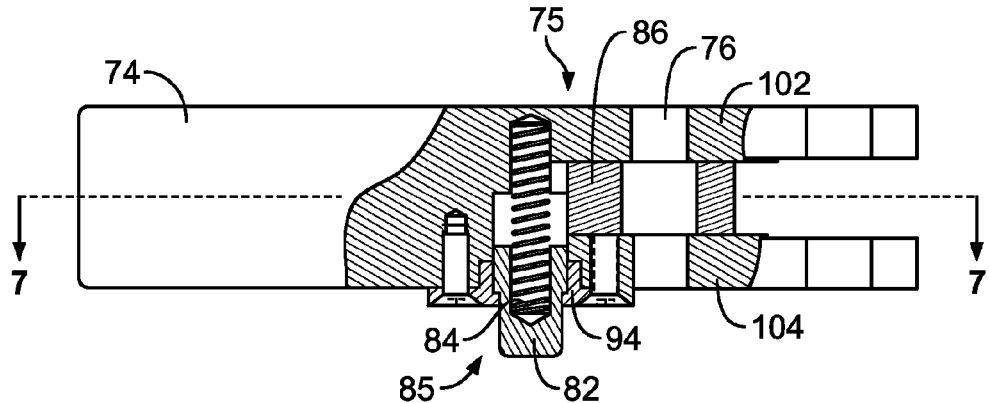
FIG. 6 is a section view taken along line 7-7 of FIG. 6.
Figure 7:
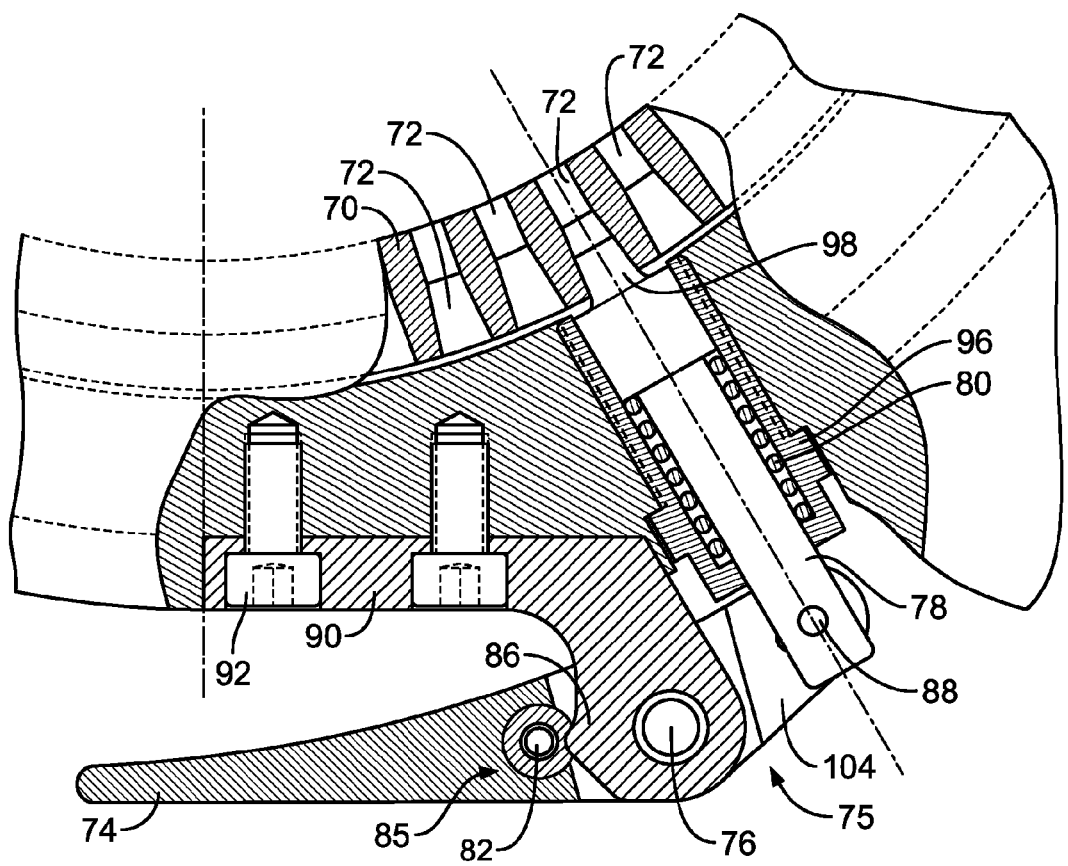
FIG. 7 is an enlarged detail view of the section shown in FIG. 4.

As shown in FIGS. 6 and 7, a rotation indexing and locking assembly generally indicated at 75 allows the swing head 52 to be quickly and easily rotated to a desired azimuth position, and then locked into position. The assembly 75 includes a lever 74 pivotally attached to a side of the swing plate 52 on a pivot pin 76. The pivot pin 76 may be attached to a lever bracket 90 that is attached onto the swing plate using bolts 92. A plunger 78 may have a tapered inner end 98 and an outer end pivotally attached to front end of the lever 74 via a plunger pin 88. A plunger spring 80 urges the plunger radially inwardly towards the swing axis 65. A spring tube 96 may be threaded into the swing plate 52 to hold the plunger spring in place.

Referring to FIG. 6, a cam or protrusion 86 is provided on the swing plate 52, or on the lever bracket 90, if used, and is shown in FIG. 6 positioned centrally in between an upper arm 102 and a lower arm 104 of the lever 74. A release pin 82 is captured within the lever 74 via release cap plate 94. The release pin is urged outwardly (or down as shown in FIGS. 2 and 6) by a release spring 84.

In use, the nose bracket 24 or similar accessory is attached to the arm of a camera support, such as a camera crane or camera dolly, optionally using the leveling head 22. If the leveling head is used, the level plate 42 is leveled using the jack screws 34. A camera is attached to the swing plate 52 via the fitting 54. The swing head 20 has a very low profile. The swing plate 52 has a thickness AA in FIG. 5 of about 0.5 to 1.0 inches. The hub 48 has a thickness or height BB in FIG. 5, of about 1.2 to 1.8 or 1.4 to 1.6 inches. The swing head 20 accordingly adds relatively little height to the vertical position of the camera. This can provide greater flexibility in positioning the camera as desired.

The swing plate 52 is locked against rotation because the inner end of the plunger 78 is engaged and held into one of the holes 72 by the plunger spring 80. The camera may be repositioned by pivoting or rotating the swing plate 52. This is achieved by pushing the back end of the lever 74 inwardly, causing the inner end of the plunger 78 to withdraw from the hole 72. With the plunger withdrawn, the swing plate 52 is free to rotate about the hub. When the swing plate 52 is rotated to the desired position, the lever 74 is released. The plunger spring 80 then drives the inner end of the plunger back into one of the holes 72. If the plunger is not precisely aligned with a hole when the lever 74 is released, slight additional movement in either direction will perform the alignment, with the spring moving the plunger into a hole 72 when the plunger and the hole are sufficiently aligned.

With the plunger 78 urged into a hole 72, the swing plate 52 is locked, with no discernable play. The spring 80 may have a high spring constant, so that the plunger is forcefully pushed into the hole 72. If the inner end 98 of the plunger 78 is tapered, or has a conical tip, and if the hole 72 has a complementary shape, the plunger 78 will securely lock the swing plate 52 against all movement, with no play. The lever 74 may have a long back section to provide sufficient leverage to allow the plunger to be withdrawn from the hole, without excessive hand force. For example, the back section of the lever 74, from the pivot pin 76 to the back end, may be 2-6 or 3-4 inches. Under high loading conditions or other circumstances, it is also possible to pull out on the lever 74, to further force the plunger 78 into the hole 72 of the hole ring 70 on the hub 48.

The release pin 82 and the cam 86 provide a release assembly 85 which may be used to hold the plunger 78 in a release position, without the need to continuously press the lever 74 inwardly. As shown in FIGS. 6 and 7, the release pin is normally held in the out position by the release spring 84. When release pin is in the out position, the lever 74 may be pressed in to rotate the swing plate 52, and released to lock the plate.

To allow the swing plate 52 to rotate freely without holding the lever 74 in by hand, after the lever 74 is pressed inwardly, the release pin 82 is pushed in or up. Then, with the release pin in the in position, as the lever 74 is released, the release pin 82 moves into contact with the cam 86. Although the release spring 84 continues to urge the release pin 82 outwardly, the friction force between the cam 86 and the side of the release pin 82 holds the pin in the up or in position. As a result, the lever is held in the in or release position, and the plunger is pulled back from the hole 72 in the hole ring 70. The swing plate 52 can then rotate freely about the hub 48. The swing plate 52 may then be rotated while the camera is filming or recording, to perform a so-called "free head" shot. Specifically, the camera is moved in a panning type of movement, but with rotation about a fixed axis several inches (e.g. 4 to 10 or 12 inches) apart from the lens axis. The inner and outer bearings provide for a smooth and quiet swing movement.

The release assembly 85 is deactivated simply by pushing the lever 74 inwardly momentarily. As the lever 74 is pushed in, the release pin 82 moves away from the cam 86. The release spring 84 then moves the release pin 82 back into the out position, since the friction holding force exerted by the cam 86 on the release pin 82 is removed when the release pin 82 is not held into contact with the cam. Referring to FIG. 6, when the release pin 82 is in the out position, it is below the level of the cam 86. The lever 74 can therefore return to its original position, locking the swing plate.

Thus, a novel camera swing head has been shown and described. Various changes and substitutions may of course be made without departing from the spirit and scope of the invention. The invention, therefore, should not be limited, except by the following claims and their equivalents.

The invention claimed is:

1. A camera swing head, comprising:
   a hub having a swing axis and a hole ring including a plurality of radially spaced apart holes;
   a swing plate rotatably attached to the hub and rotatable only about the swing axis;
   a lever pivotally attached to the swing plate;
   a plunger pivotally attached to the lever, with pivoting movement of the lever moving the plunger linearly on a radial axis intersecting a center of the hub;
   a plunger spring urging the plunger radially inwardly to engage an inner end of the plunger into one of the radially spaced apart holes in the hub;
   a release pin movable from a first position, wherein the release pin causes the plunger to be held out from engagement with one of the radially spaced apart holes, to a second position, wherein the plunger is movable into engagement with one of the radially spaced apart holes;
   a release pin spring biasing the release pin in a first direction; and
   a spring tube threaded into the swing plate and enclosing the release pin spring.

2. The camera swing head of claim 1 with the swing plate rotatably attached to the hub via an inner bearing and an outer bearing.

3. The camera swing head of claim 2 further comprising a raised hole ring on the hub, and with the radially spaced apart holes extending horizontally through the raised hole ring.

4. The camera swing head of claim 1 with the hub further comprising a threaded stud for attaching to the camera swing head to a supporting structure.

5. The camera swing head of claim 1 with the lever pivotally attached to a side of the swing plate.

6. The camera swing head of claim 1 with the hub having a height less than 3 inches.

7. The camera swing head of claim 1 with the swing plate having a first end having a radius R, and with the swing plate having a second end also having a radius R, and with the swing plate having a length less than 4R.

8. The camera swing head of claim 1 further comprising a cam on the swing head, with the release pin engaged with the cam when the release pin is in the first position, and with the release pin disengaged from the cam when in the second position.

9. The camera swing head of claim 3 with the outer bearing having an inner diameter fit around the raised hole ring.

10. A camera swing head, comprising:
    a hub having a hole ring including a plurality of radially spaced apart holes;
    a swing plate rotatably attached to the hub;
    a lever pivotally attached to the swing plate;
    a plunger pivotally attached to the lever, with pivoting movement of the lever moving the plunger linearly on a radial axis intersecting a center of the hub;

a plunger spring urging the plunger radially inwardly to engage an inner end of the plunger into one of the radially spaced apart holes in the hub;

a release pin movable from a first position, wherein the release pin causes the plunger to be held out from engagement with one of the radially spaced apart holes, to a second position, wherein the plunger is movable into engagement with one of the radially spaced apart holes;

a release pin spring biasing the release pin in a first direction; and a spring tube threaded into the swing plate and enclosing the release pin spring.

11. The camera swing head of claim 10 with the swing plate rotatably attached to the hub via an inner bearing and an outer bearing.

12. The camera swing head of claim 11 further comprising a raised hole ring on the hub, and with the radially spaced apart holes extending horizontally through the raised hole ring.

13. The camera swing head of claim 10 with the hub further comprising a threaded stud for attaching to the camera swing head to a supporting structure.

14. The camera swing head of claim 10 with the lever pivotally attached to a side of the swing plate.

15. The camera swing head of claim 10 with the hub having a height less than 3 inches.

* * * * *